United States Patent
Schmitt et al.

(10) Patent No.: US 9,193,017 B2
(45) Date of Patent: Nov. 24, 2015

(54) METHOD FOR PRODUCING A LEAD-FREE, PLATED ALUMINIUM PLAIN BEARING

(75) Inventors: Holger Schmitt, Pfungstadt (DE); Daniel Meister, Mainz-Kastel (DE); Gerd Andler, Bad Schwalbach (DE); Fabio Gaetano Cosentino, Wiesbaden (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 211 days.

(21) Appl. No.: 13/985,814

(22) PCT Filed: Oct. 27, 2011

(86) PCT No.: PCT/EP2011/068863
§ 371 (c)(1),
(2), (4) Date: Aug. 15, 2013

(87) PCT Pub. No.: WO2012/110115
PCT Pub. Date: Aug. 23, 2012

(65) Prior Publication Data
US 2013/0318795 A1 Dec. 5, 2013

(30) Foreign Application Priority Data
Feb. 15, 2011 (DE) .......................... 10 2011 004 133

(51) Int. Cl.
*B23P 15/00* (2006.01)
*F16C 33/12* (2006.01)
(Continued)

(52) U.S. Cl.
CPC ................. *B23P 15/003* (2013.01); *C21D 9/40* (2013.01); *C22C 21/00* (2013.01); *C22C 21/003* (2013.01); *C22C 21/02* (2013.01); *C22F 1/04* (2013.01); *C22F 1/043* (2013.01); *C23C 30/00* (2013.01); *F16C 33/121* (2013.01); *F16C 33/14* (2013.01); *F16C 9/04* (2013.01); *F16C 2204/22* (2013.01);
(Continued)

(58) Field of Classification Search
CPC ................... B21B 2003/001; B21B 2001/383; B21H 7/00; B22D 11/003; B23P 15/003; C21D 9/40; C22C 21/003; C22C 21/02; C22C 21/04; C22F 1/04; C22F 1/043; F16C 19/04; F16C 33/12; F16C 33/121; F16C 33/122; F16C 33/14; F16C 2202/02; F16C 2202/04; F16C 2202/50; F16C 2204/22; F16C 2223/62; F16C 2240/06; F16C 2240/08; Y10T 29/49636; Y10T 29/46941; Y10T 29/49645; Y10T 29/49647; Y10T 29/49679; Y10T 29/49705; Y10T 29/49709
See application file for complete search history.

(56) References Cited

U.S. PATENT DOCUMENTS 4,732,820 A 3/1988 Mori
4,818,628 A * 4/1989 Alexander et al. ............ 428/561
(Continued)

FOREIGN PATENT DOCUMENTS

| CN | 1334353 A | 2/2002 |
| CN | 2924145 Y | 7/2007 |

(Continued)

*Primary Examiner* — David Bryant
*Assistant Examiner* — Matthew P Travers
(74) *Attorney, Agent, or Firm* — Robert L. Stearns; Dickinson Wright, PLLC

(57) ABSTRACT

In a method for producing a plain bearing, an aluminum-iron-silicon alloy is rolled onto a steel backing, wherein the ratio of iron to silicon is between 2:1 and 4:1. A plain bearing has a sliding surface of such an aluminum-iron-silicon alloy.

8 Claims, 2 Drawing Sheets

Figure 1:
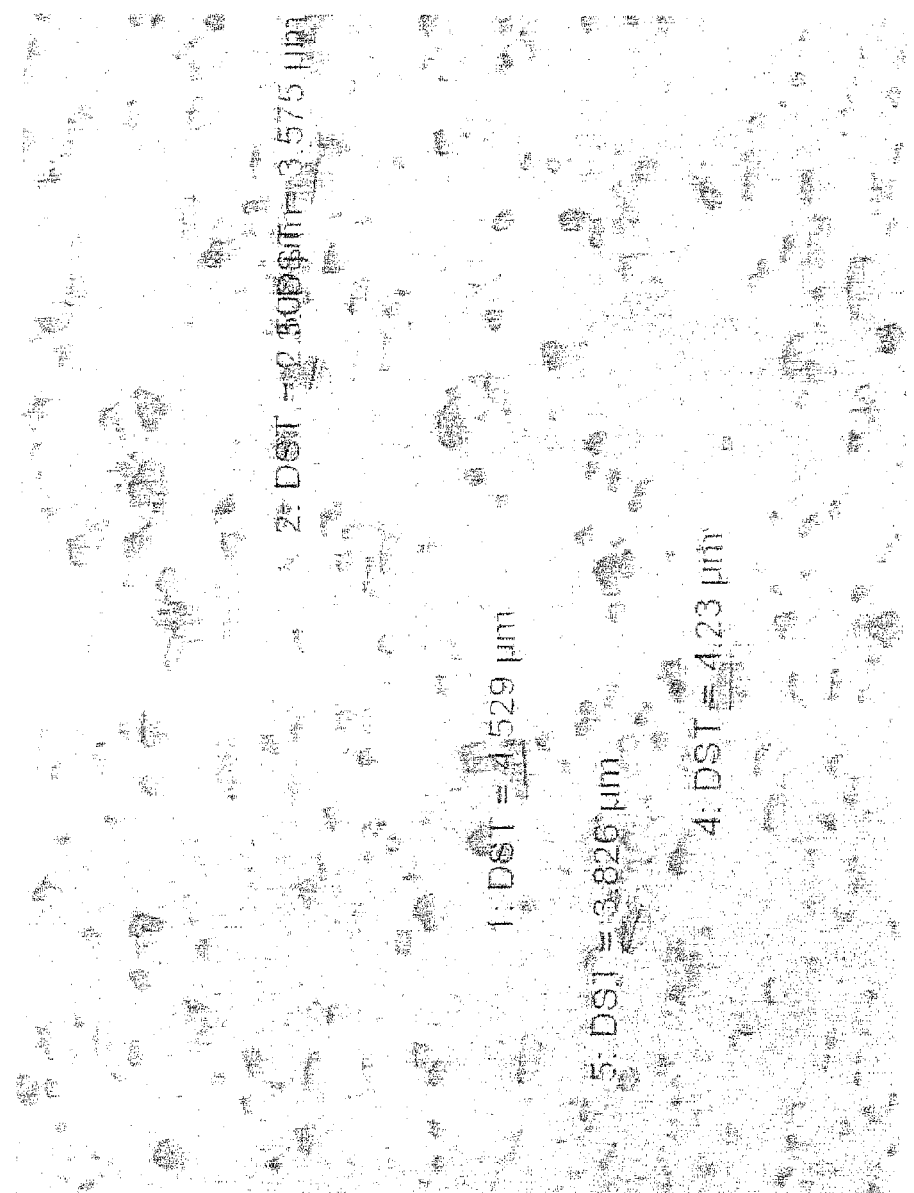

(51) Int. Cl.
  *F16C 33/14* (2006.01)
  *C22F 1/04* (2006.01)
  *C21D 9/40* (2006.01)
  *C22C 21/00* (2006.01)
  *C23C 30/00* (2006.01)
  *C22C 21/02* (2006.01)
  *C22F 1/043* (2006.01)
  *F16C 9/04* (2006.01)

(52) U.S. Cl.
  CPC .......... *Y02T 10/865* (2013.01); *Y10T 29/49641* (2015.01)

(56) References Cited

U.S. PATENT DOCUMENTS

| | | | |
|---|---|---|---|
| 5,041,339 A * | 8/1991 | Mori et al. | 428/552 |
| 5,286,445 A | 2/1994 | Kamiya | |
| 6,068,931 A * | 5/2000 | Adam et al. | 428/469 |
| 6,673,168 B1 * | 1/2004 | Matucha et al. | 148/437 |
| 6,899,844 B2 * | 5/2005 | Desaki et al. | 419/14 |
| 6,902,324 B2 * | 6/2005 | Steffens et al. | 384/279 |
| 2002/0034454 A1 | 3/2002 | Fujita et al. | |
| 2003/0185701 A1 | 10/2003 | Sahoo et al. | |
| 2009/0245702 A1 | 10/2009 | Kagohara et al. | |
| 2009/0246072 A1 * | 10/2009 | Nirasawa et al. | 420/529 |

FOREIGN PATENT DOCUMENTS

| | | |
|---|---|---|
| CN | 101279345 A | 10/2008 |
| DE | 19833200 A1 | 1/2000 |
| DE | 102004025557 A1 | 1/2005 |
| DE | 102005047037 A1 | 4/2007 |
| EP | 2105512 A1 | 9/2009 |
| JP | H04202734 A | 7/1992 |
| JP | 2002038230 A | 2/2002 |
| WO | WO-9611800 A1 | 4/1996 |

* cited by examiner

Micrograph after annealing at 220°C for 8 hours

US 9,193,017 B2

METHOD FOR PRODUCING A LEAD-FREE, PLATED ALUMINIUM PLAIN BEARING

BACKGROUND OF THE INVENTION

1. Technical Field

The invention relates to a method for producing a sliding bearing of an aluminium-iron-silicon alloy. The invention further relates to a sliding bearing with a sliding surface of an aluminium-iron-silicon alloy.

2. Related Art State of the Art

When producing sliding bearings, in particular connecting-rod bearings for internal combustion engines, it is necessary to use materials that are characterized by high abrasion resistance. Furthermore, it is expedient that the alloys used as materials for such applications are characterized by very good availability and a low price. Furthermore, it is desirable that the materials of the sliding bearings are of moderate hardness in order to ensure good embeddability of hard particles (contaminants) in the engine.

In the past, sliding bearings were frequently made of alloys, the chemical composition of which became increasingly complicated owing to the addition of more and more alloy elements. With regard to a pair of sliding components used in an engine, DE 10 2005 047 037 A1 shows an aluminium base alloy for sliding elements of an internal combustion engine or of a hydraulic system, which are to be operated under the friction conditions of mixed/boundary friction and/or hydrodynamics, but also those of dry run, which is characterized in that it consists in the material volume and/or on the friction surface of an aluminium base alloy with at least 80 wt. % of aluminium.

US 2003/0185701 A1 describes a process for the production of an aluminium-iron-vanadium-silicon alloy which is supposed to be characterized by high strength and high wear resistance. In this case, the primary intermetallic phases are modified, as are the interdendritic silicide phases, in that the melt is treated with elemental magnesium or alloys containing magnesium. DE 10 2004 025 557 A1 and US 2009-0245702 A1 constitute further state of the art.

SUMMARY OF THE INVENTION

An object forming the basis for the invention is to provide a method for the production of a sliding bearing in which an alloy is to be used which, in contrast to hitherto plated, lead-free aluminium materials, has a simpler chemical composition and is simpler to produce, with sliding properties being improved at the same time.

According thereto, a sliding bearing is produced by rolling an aluminium-iron-silicon alloy onto a steel back. Aluminium-iron-silicon alloys are characterized by a low density, which is advantageous for the resulting component since this means that it is low in weight. Furthermore, they are of moderate hardness, which is advantageous for use in a sliding bearing since this means that there is only little abrasion of the material with which the sliding bearing is in contact. Moreover, the materials are inexpensive, and the alloy is easy to produce owing to its composition.

It is preferred that the alloy comprises up to 10% of iron and up to 3% of silicon. The specification % relates to percent by weight here and in the following. By means hereof, the resulting final hardness of the thus resulting alloy can be adjusted.

According to the invention, the iron/silicon ratio is between 2:1 and 4:1. As a result, iron silicides and aluminium-iron compounds may form, dependent on the desired final hardness, which permit selective adjustment of the desired final hardness of the material.

It is also preferred that the aluminium-iron-silicon alloy comprises up to 20%, particularly preferred up to 15%, of tin. Thus, the sliding properties and the mechanical properties can be adjusted with regard to the use as a sliding bearing.

It is also preferred that the aluminium-iron-silicon alloy comprises up to 1%, preferably up to 0.2%, even more preferably 0.02 to 0.05%, of strontium and/or sodium. The precipitation behavior of the iron silicides and aluminium-iron compounds can be improved by this. In particular, the shape and size of the precipitates can thus be adjusted during casting. Moreover, as fine a distribution as possible of the iron silicide particles and the aluminium-iron-compound particles is achieved, which produces uniform mechanical properties of the material. The addition of sodium leads to finer precipitates which, however, occur in larger numbers (see e.g. "*Schmelzbehandlung von Aluminium und Aluminiumlegierungen mit MTS*" as published by FOSECO). Furthermore, high thermal conductivity is achieved, which is roughly equivalent to that of pure aluminium and which causes better heat dissipation under mixed friction conditions.

It is also preferred that the steel back preferably comprises C10 or C22 steel. This material, onto which the aluminium-iron-silicon alloy is rolled (plated), has the advantage that the material is inexpensive and easy to obtain and that it is characterized by good mechanical properties, in particular high strength.

A further advantageous embodiment is that the method comprises the following steps in the specified order:
  (A) melting the material of the aluminium-iron-silicon alloy,
  (B) casting the material produced in step (A),
  (C) heating the material produced in step (B),
  (D) rolling the material produced in step (C),
  (E) rolling the material rolled in step (D) onto a steel support which later forms at least a part of the steel back,
  (F) heating the material produced in step (E),
  (G) optionally: deforming the material produced in step (F).

An advantage of this method is that the subsequent hardness of the resulting material can be easily controlled by the method steps. Since, as mentioned above, moderate hardness is desired, the material thus produced can be easily adapted to the desired application. Furthermore, all of the steps can be easily performed industrially, which also means that the costs for carrying out the method are relatively low.

It is also preferred that during the casting in step (B) the material is cast into a strand by means of a continuous casting process. The advantage of this is that a strand can be easily processed industrially.

It is also preferred that the heating in step (C) is carried out at a temperature of approx. 450 to 550° C. and takes 10 to 20 hours. The advantage of this is that the hardness of the resulting material is significantly reduced by this, which particularly facilitates the subsequent rolling step (D). Moreover, this results in a homogenization of the material.

It is further preferred that the rolling in step (D) results in a thickness of the material of approx. 0.8 to 1.2 mm. This has the advantage that the thus relatively thin material is well prepared for a use and plating (E) as is performed in the next step.

Furthermore, it is preferred that the heating in step (F) takes 6 to 10 hours and occurs at approx. 180° C. to 240° C. Thus, the hardness is decreased and the desired embeddability is ensured at the same time in that dislocations are reduced. Both effects are advantageous when using the material in a sliding bearing.

It is also preferred that the rolling in step (G) takes place such that there is a deformation by 5 to 15%. What can be achieved by this is that the hardness of the finished material can be adapted to the application.

The sliding bearing according to the invention has a sliding surface with an aluminium-iron-silicon alloy.

According to the invention, the iron/silicon ratio is between 2:1 and 4:1. As a result, iron silicides and aluminium-iron compounds may form, dependent on the desired final hardness, which permit selective adjustment of the desired final hardness of the material.

It is also preferred that the aluminium-iron-silicon alloy comprises up to 15% of tin. Thus, the sliding properties and the mechanical properties can be adjusted with regard to the use as a sliding bearing.

It is also preferred that the aluminium-iron-silicon alloy comprises up to 0.2%, preferably 0.02 to 0.05%, of strontium or sodium. The precipitation behavior and precipitation form of the iron silicides and aluminium-iron compounds can be improved by this. In particular, the shape and size of the precipitates can thus be adjusted. Moreover, as fine a distribution as possible of the iron silicide particles and the aluminium-iron-compound particles is achieved, which ensures uniform mechanical properties of the material. Furthermore, high thermal conductivity is achieved, which is roughly equivalent to that of pure aluminium and which causes better heat dissipation under mixed friction conditions.

Furthermore, it is preferred that the bearing material has a hardness of 40 to 60 HBW 1/5/30. This has the advantage that this hardness is particularly suitable for use in a sliding bearing.

THE DRAWINGS

Figure 2:
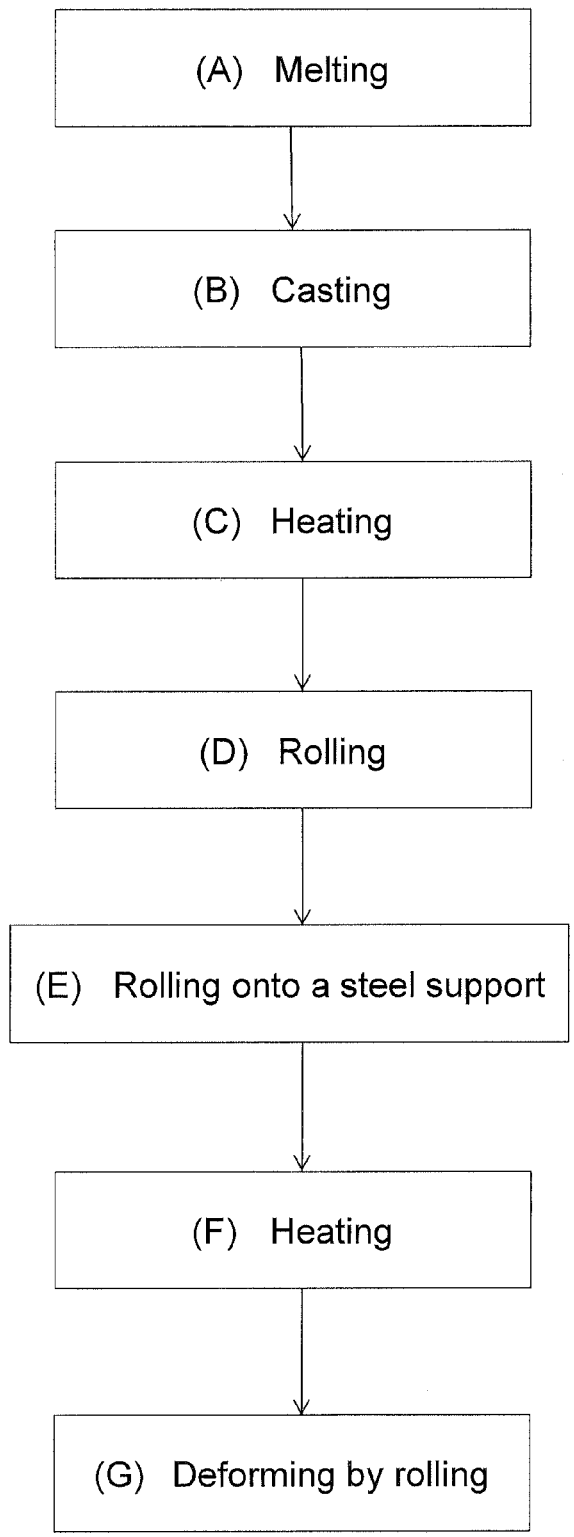

FIG. 1 shows a micrograph of a material produced according to the invention after completion of step (F); and FIG. 2 shows a flow chat of the method steps.

FIG. 1 shows a micrograph of a material produced according to the invention after completion of step (F). In this case an aluminium alloy was used to which 1.09% of silicon and 3.45% of iron were added. The material was cast in a continuous casting process. Immediately after casting and after solidification, the material had a hardness of 50 HBW 1/5/30.

Subsequently, the material was annealed at a temperature of approx. 450 to 550° C. for 16 hours. After one hour, the material had a hardness of 40 HBW 1/5/30, and after two hours it had a hardness of 38 HBW 1/5/30 which it also had after three hours, four hours and five hours. After six hours of annealing the material had a hardness of 35 HBW 1/5/30, after seven hours of annealing it had a hardness of 37 HBW 1/5/30, after eight hours of annealing it had a hardness of 36 HBW 1/5/30, after twelve hours of annealing it had a hardness of 35 HBW 1/5/30, and after sixteen hours of annealing, i.e. after completion of the heating in step (B), it had a hardness of 36 HBW 1/5/30.

Subsequently, the material, which previously had a thickness of 8 mm, was rolled to a thickness of 1.1 mm. During rolling, a hardness of 58 HBW 1/5/30 was achieved with a thickness of 1.5 mm, and after a thickness of 1.1 mm was achieved, the material had a hardness of 62 HBW 1/5/30. For the sake of comparison, the material was further rolled to 0.45 mm, which resulted in a hardness of 63 HBW 1/5/30.

For comparison, a sample of the material was further annealed at 450 to 550° C. A hardness of 36 HBW 1/5/30 was detected even after 20 hours of annealing and 24 hours of annealing.

The material rolled to 1.1 mm was then rolled (plated) onto a steel support. Prior to plating, the initial thickness of the steel was 2.8 mm, and the initial thickness of the aluminium alloy was, as mentioned above, 1.1 mm. After plating, the thickness of the steel was between 1.1 and 1.15 mm, and the thickness of aluminium was between 0.38 and 0.42 mm. Thus, there was a total deformation of 62% while the steel material was deformed by 50% and the aluminium material was deformed by 64%. A hardness of 63 HBW 1/5/30 was achieved by this plating step.

After annealing the material at 180 to 240° C., a hardness of 43 HBW 1/5/30 was measured. The resulting material can be seen as a microsection in FIG. 1. The precipitates (designated with "DST") are clearly visible in an aluminium matrix, and it is clearly evident that the precipitates have a typical diameter of approx. 4 µm and are formed as islands in the aluminium matrix.

Finally, the material was rolled to a total thickness of 1.33 mm, with the steel being 1 mm thick and the aluminium having a thickness of 0.3 mm. In this case the total material was deformed by 13%, with the steel component also being deformed by 13%. The aluminium was deformed by 22%. In this case the resulting hardness was 49 HBW 1/5/30.

The invention claimed is:

1. A method for producing a sliding bearing in which lead-free aluminium-iron-silicon alloy comprising up to 10% iron, up to 3% silicon, up to 20% of tin and up to 0.2% of strontium or sodium, the iron/silicon ratio being between 2:1 and 4:1, is processed by the following steps in the specified order:
   (A) melting the aluminium-iron-silicon alloy,
   (B) casting the material produced in step (A),
   (C) heating the material produced in step (B) at a temperature of 450 to 550° C. for 10 to 20 hours,
   (D) rolling the material produced in step (C),
   (E) rolling the first material rolled in step (D) onto a steel support which later forms at least a part of a steel back, and
   (F) heating the material produced in step (E).

2. The method of claim 1, including, as step (G), deforming the material produced in step (F) by rolling.

3. The method according to claim 2, wherein deformation by 5 to 15% occurs in step (G).

4. The method according to claim 1, wherein the aluminium-iron-silicon alloy comprises 0.02 to 0.05%, of strontium or sodium.

5. The method according to claim 1, wherein the material for the steel back comprises C10 or C22 steel.

6. The method according to claim 1, wherein the casting in step (B) occurs by a continuous casting process.

7. The method according to claim 1, wherein the rolling in step (D) results in a thickness of the material of 0.8 to 1.2 mm.

8. The method according to claim 1, wherein the heating in step (F) occurs at 180° C. to 240° C. and takes 6 to 10 hours.

* * * * *

UNITED STATES PATENT AND TRADEMARK OFFICE
CERTIFICATE OF CORRECTION

PATENT NO. : 9,193,017 B2  
APPLICATION NO. : 13/985814  
DATED : November 24, 2015  
INVENTOR(S) : Schmitt et al.

Page 1 of 1

It is certified that error appears in the above-identified patent and that said Letters Patent is hereby corrected as shown below:

In the Specification:

Column 1, line 11, delete "State of the Art".

Signed and Sealed this
First Day of March, 2016

Michelle K. Lee
*Director of the United States Patent and Trademark Office*